(12) United States Patent
Robitaille et al.

(10) Patent No.: US 11,509,517 B2
(45) Date of Patent: *Nov. 22, 2022

(54) SERVICE OAM VIRTUALIZATION

(71) Applicant: Accedian Networks Inc., Saint-Laurent (CA)

(72) Inventors: Claude Robitaille, St-Placide (CA); Marc Lanoue, Lachine (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,711

(22) Filed: Mar. 1, 2021

(65) Prior Publication Data
US 2021/0184912 A1    Jun. 17, 2021

Related U.S. Application Data

(63) Continuation of application No. 16/515,413, filed on Jul. 18, 2019, now Pat. No. 10,999,121, which is a continuation of application No. 15/591,306, filed on May 10, 2017, now Pat. No. 10,404,522, which is a continuation of application No. 14/580,667, filed on Dec. 23, 2014, now Pat. No. 9,692,712.

(51) Int. Cl.
| | |
|---|---|
| *H04L 41/0213* | (2022.01) |
| *H04L 47/70* | (2022.01) |
| *H04L 45/586* | (2022.01) |
| *H04L 69/22* | (2022.01) |

(52) U.S. Cl.
CPC ........ *H04L 41/0213* (2013.01); *H04L 45/586* (2013.01); *H04L 47/825* (2013.01); *H04L 69/22* (2013.01)

(58) Field of Classification Search
CPC . H04L 41/0213; H04L 45/586; H04L 47/825; H04L 69/22
See application file for complete search history.

(56) References Cited

U.S. PATENT DOCUMENTS

| | | | |
|---|---|---|---|
| 6,915,436 B1 * | 7/2005 | Booth, III | G06F 21/42 709/223 |
| 2013/0044591 A1 * | 2/2013 | Song | H04L 45/50 370/228 |
| 2013/0163594 A1 * | 6/2013 | Sharma | H04L 12/4633 370/392 |

* cited by examiner

*Primary Examiner* — Mansour Oveissi
(74) *Attorney, Agent, or Firm* — Stratford Group Ltd.

(57) ABSTRACT

A SOAM virtualization system for a network having at least first and second maintenance entities coupled to each other comprises a network controller coupled to at least one of the first and second maintenance entities through a tunnel for virtualizing a SOAM network function on the at least one of the first and second maintenance entities to which the network controller is coupled. The network controller may be coupled to the first and second maintenance entities through first and second tunnels, respectively. The first maintenance entity may an originator device, and the second maintenance entity may be a destination device, with the network controller virtualizing the SOAM network function on both devices. The network controller may send a packet containing a tunnel header and a SOAM frame via the first tunnel to the originator device, which then sends the packet containing the SOAM frame to the destination device.

10 Claims, 3 Drawing Sheets

SERVICE OAM VIRTUALIZATION

CROSS-REFERENCE TO RELATED APPLICATIONS

This application is a continuation of U.S. patent application Ser. No. 16/515,413, filed Jul. 18, 2019, now allowed, which is a continuation of U.S. patent application Ser. No. 15/591,306, filed May 10, 2017, now U.S. Pat. No. 10,404,522, which is a continuation of U.S. patent application Ser. No. 14/580,667, filed Dec. 23, 2014, now U.S. Pat. No. 9,692,712, which are hereby incorporated by reference herein in their entireties.

FIELD OF THE INVENTION

The present disclosure relates to network service testing virtualisation and Service Operation Administration and Maintenance (SOAM) virtualisation.

BRIEF SUMMARY

In accordance with one embodiment, a SOAM virtualization system is provided for a network having at least first and second maintenance entities coupled to each other, the system comprises a network controller coupled to at least one of the first and second maintenance entities through a tunnel for virtualizing a SOAM network function on the at least one of the first and second maintenance entities to which the network controller is coupled. In one implementation, the network controller is coupled to the first and second maintenance entities through first and second tunnels, respectively. The first maintenance entity may an originator device, and the second maintenance entity may be a destination device, with the network controller virtualizing the SOAM network function on both devices. The network controller may send a packet containing a tunnel header and a SOAM frame to the originator device via the first tunnel, with the originator device including a one-way packet generator that removes the tunnel header from the packet and then sends the packet containing the SOAM frame to the destination device, and the destination device receiving the packet from the originator device and sending the SOAM frame to the network controller in a packet transmitted via the second tunnel.

The originator device preferably includes a two-way packet generator that removes the tunnel header from the packet and then sends the packet containing the SOAM frame in a loopback function that loops back the SOAM frame to the originator device, the originator device containing a frame inspection function receiving the looped back SOAM function that forwards the received SOAM frame to the network controller in a packet via the first tunnel. The originator device may include a two-way packet generator that removes the tunnel header from the packet and then sends the packet containing the SOAM frame to the destination device, the destination device sends the SOAM frame to the network controller in a packet via the second tunnel, the network controller processes the SOAM frame and returns the processed SOAM frame to the destination device in a packet containing a tunnel header via the second tunnel, and the destination device removes the tunnel header and then sends the packet containing the processed SOAM frame to the originator device.

Remote network devices may be coupled to the network controller to create virtual remote ports to the network controller. The remote devices are preferably coupled to the network controller by tunnels, and the payloads of the tunnels are preferably in SOAM frames transmitted through the tunnels without processing in the remote devices.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
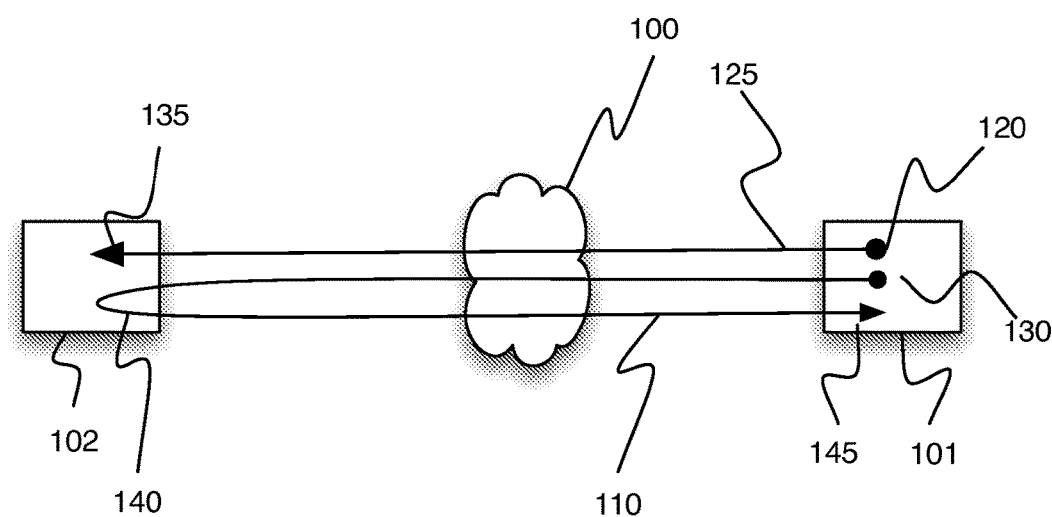
FIG. 1 is an example of message flow for prior art applications.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Network Service, Operation, Administration and Maintenance (SOAM) includes functions such as fault management (detection, verification, localization and notification), delay measurement, packet loss detection, client failure signaling, and vendor-specific information applied on a Maintenance Entity (ME). An ME is an entity that needs to be managed in the network, and is typically located on a subscriber, operator or service provider network. SOAM functions are difficult to manage, generally computationally intensive and do not scale well in large networks, such as, for example, in Software-Defined Networks (SDN). A Two-way Active Measurement Protocol (TWAMP) is an example of a SOAM function that is difficult to scale.

A Network Functions Virtualization (NFV) is a network architecture concept that uses virtualization-related technologies to virtualize entire classes of network node functions into building blocks that may be connected, or linked/chained together to create communication services. NFV implements network functions running on proprietary hardware distributed in a network into software modules that run into a virtual server/controller to leverage (high volume) standard servers and IT virtualization. The objective is to support multiple versions in parallel and to allow use of a single physical platform/server for different applications and users.

A Virtualized Network Function (VNF) may consist of one or more virtual machines running different software and processes, on top of industry standard high volume servers, switches and storage, or even cloud computing infrastructure, instead of having custom hardware appliances for each network function. The main advantage comes from the facility to innovate toward new network functions and services that are only practical in a pure software network environment with assisted hardware (e.g., FPGA). The functions and services can be deported onto a remote centralized server/controller. Rather than upgrading remote units/devices spread over a whole network to modify any existing functions or services, centralized functions and services allow for new feature introduction or correction more easily without impacting potentially thousands of units/devices. The objective is to minimize the unit/device specific features that can only be supported on such dedicated and specialized devices.

There is a need to virtualize the SOAM functions to centralize the processing on highly computation capable servers, allowing for easier management, maintenance and greater scalability. For example, generation and inspection of test packets is computationally expensive and the related statistics require a lot of memory. This function is difficult to implement on devices that have limited hardware resources (CPU, memory) such as Small-Form Pluggable (SFP) devices.

SOAM virtualization is particularly well adapted for slow protocols that may be redirected to a controller, while remote devices manage locally the data plane for line rate frames/packets processing.

For example, SOAM supports Continuity Check Messages (CCMs) that are used to detect failures between two endpoints. The CCMs may be sent at a high rate with generally the same content (except for an optional sequence number that is relatively easy to generate). The remote device may send CCMs and receive CCMs locally without intervention of the network controller, but when a CCM with different content is received (or required to be sent), then the network controller is involved to perform the more complex analysis.

FIG. 1 shows an example of prior-art SOAM performance monitoring between two MEs 101 and 102 over a network 100. In this case the MEs implement all the SOAM protocol. An originator device 101 may include a one-way packet generation function 120 that creates a packet 125 destined for a destination device 102. The packet contains information required for the monitoring such as, for example, a timestamp and/or frame counter. The destination device 102 generally includes a packet inspection function 135 to compute different measurements (e.g., delay, jitter, loss) based on the information provided in the test packet. The test originator device 101 may also include a two-way packet generation 130 to perform two-way performance monitoring 110 over the network 100. In this case, the destination device 102 loops back 140 the packet and resends to the test originator device 101, which also generally includes a packet inspection function 145 to compute the statistics.

Figure 2:
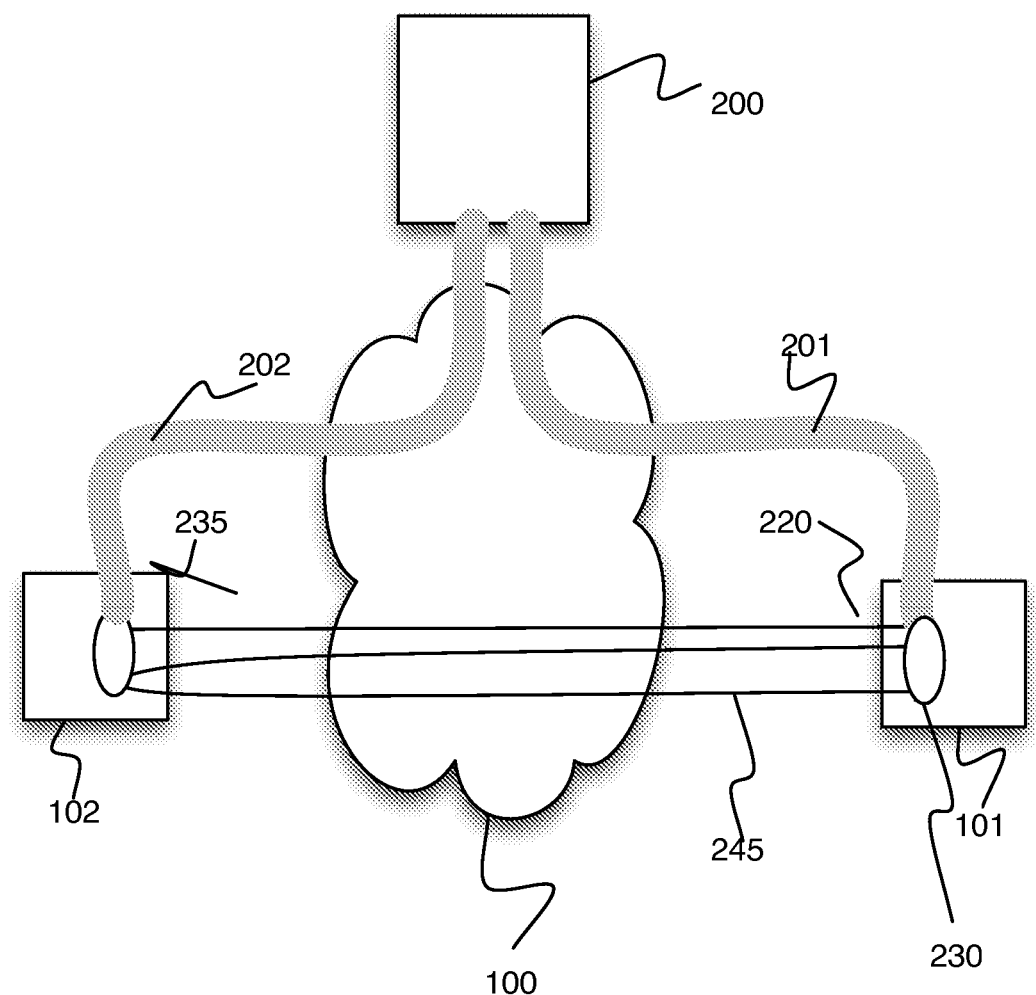
FIG. 2 is an example of an embodiment of service virtualization.
Figure 3:
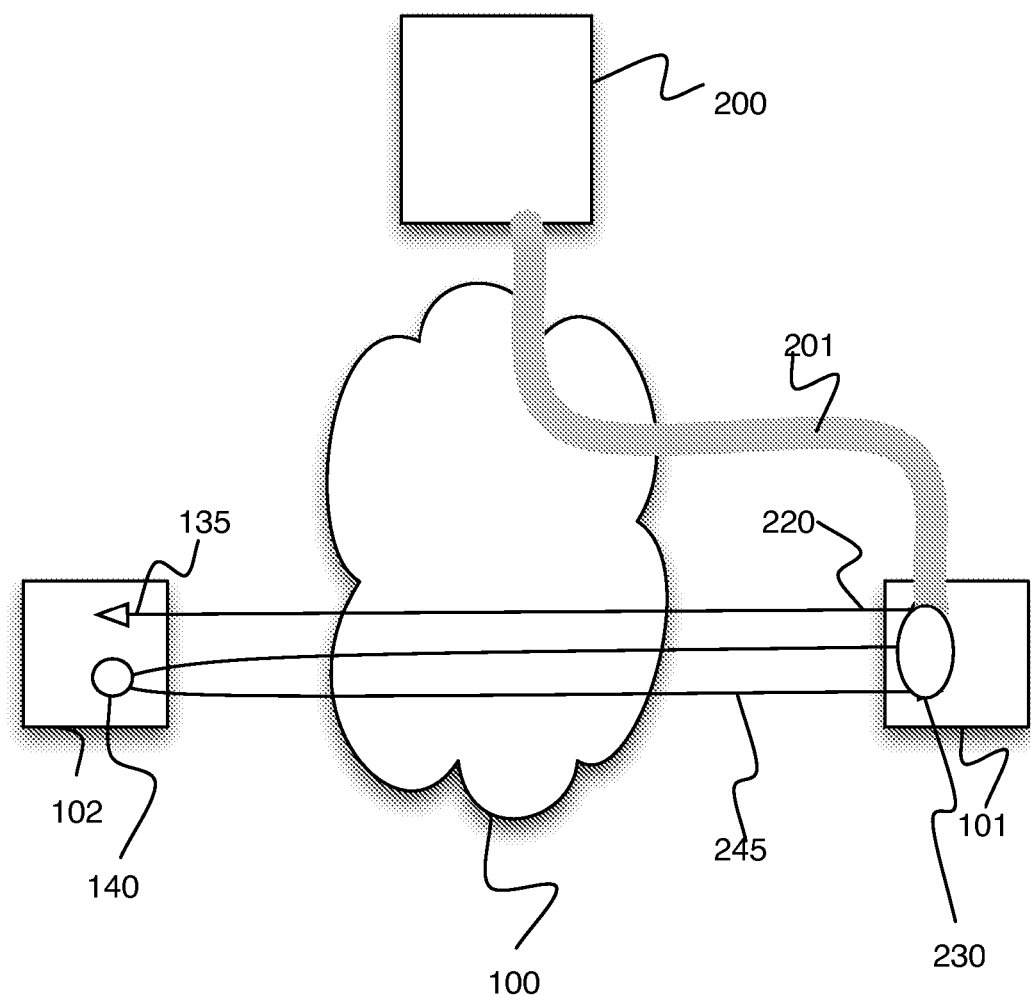
FIG. 3 is an example of an embodiment of service virtualization on one remote device.

FIG. 2 shows an example of an embodiment where a network controller 200 is used to virtualize a SOAM network function on both an originator device 101 and a destination device 102. It should be understood that only one of the devices could be virtualized, while the other device implements the full functionality locally without requiring a connection to the network controller 200 as shown in FIG. 3.

In the system illustrated in FIG. 2, standard communication tunnels 201 and 202 are used to communicate with the network devices 101 and 102 respectively. In the case of a one-way SOAM function 220, the originator device 101 receives a tunnel packet containing a tunnel header and a SOAM frame from the network controller 200 via the tunnel 201. A frame forwarder 230 in the originator device 101 then removes the tunnel header from the packet and, if required, may add a timestamp to the packet before sending the packet to the destination device 102. It will be understood that the network controller 200 handles all the processing and frame payload required to generate the SOAM frame contained in the tunnel payload. Additional metadata (e.g., the port to use and the address of destination device) may optionally be added to the tunneled packet to instruct the frame forwarder on the device 101 to perform specific tasks on the frame prior to sending (e.g., push/pop of a VLAN header, adding the timestamp).

In the destination device 102, a frame forwarder 235 adds a reception timestamp and sends the received SOAM frame in a tunneled packet, along with optional metadata, to the network controller 200, which performs the statistics computation and storage. In the case of a two-way OAM function 245, the network controller 200 generates a packet and sends it to the frame forwarder 230 of the originator device 101 via the standard tunnel 201 along with optional metadata. The frame forwarder 230 removes the tunnel header, and may add a timestamp and perform other functions as per the metadata, and then sends the packet to the destination device 102. A loop back function 140 in the destination device 102 loops back the SOAM frame so that it may be received by the frame forwarder 230 located in the originator device 101. The frame forwarder 230 may add a reception timestamp, along with optional metadata, and then forwards the received SOAM frame in a tunneled packet to the network controller 200 for statistics processing and storage.

A plurality of network controllers can be implemented in a network. They may control a distinct set of devices or control the same devices but for different functions.

In another embodiment, the loopback function 140 can also be virtualized. In this case, the SOAM frame is sent to the network controller in a tunneled packet for processing of the originating frame. Then the reply SOAM frame is sent from the network controller in a tunneled packet before it is returned to the originating device via the destination device 102, after the device 102 has removed the tunnel header and may have added a timestamp and performed other functions as per the metadata.

Remote devices spread in the network are linked to the network controller as virtual remote ports. The link between the controller and the remote devices to create those virtual remote ports is illustrated by the tunnels shown in FIGS. 2 and 3. The NFV embodiment does not preclude having proxy or "coprocessor" functions executed in the remote devices having hardware processing capabilities (e.g., FPGA). Depending on the processing and capability of the remote device, more or less functionality can be implemented directly on the remote device, while the rest is offloaded to the network controller.

The modules such as the SOAM module running in the network controller must be able to use ports found on remote devices as virtual remote ports in a way that they are seen as extensions to the physical ports directly connected to the network controller itself. The controller first discovers remote devices deployed in the network through its own local ports connected to the network using a proprietary or IP agnostic discovery protocol. The controller may in fact use many discovery protocol instances in order to adapt to the network environment and discover all the remote devices the need to be managed. The proprietary discovery protocol is applied in layer 2 (Ethernet) networks using a proprietary Ethernet type and operational code, or in layer 3 (UDP/IP) networks using a proprietary destination UDP port combined with another operational code in the UDP payload. The IP agnostic discovery protocol is similar to the layer 3 proprietary one having the same destination UDP port and operational code in the UDP payload except it is not required to have the destination IP address corresponding to a remote device.

The IP agnostic discovery mode uses a network element unicast destination IP address that is found farther in the network so remote devices can be discovered in the path to the destination. Each remote device receiving such discovery frame or packet responds with an advertisement frame/packet to let the originator know about its own characteristics and attributes, such as device type, speed, base MAC address, applications running locally and port status. Once that is done, the controller establishes a secured session with the remote device based on a stream cipher (such as Grain-128a) that allows exchanges of control and management packets. This secured session is also used to report to the controller the remote devices' port status so that modules, protocols and even the kernel are able to report an up/down status that reflects not only the status of the local connection on the devices, but also the status of the session.

The controller adds the remote devices' ports into the list of ports available to modules, protocols and features (e.g., SOAM, Service Activation Testing) running on the controller. If a module uses one of the remote virtual ports, then it is up to the controller's system and kernel to encapsulate the messages, frames or packets to the proper tunnel managed through the secured session.

Thus, frames or packets sent/received through a virtual remote port and sent to/coming from a network controller are authenticated using the same stream cipher. The traffic is sent and received using a tunnel represented by the secured session set up between the remote devices and the network controller. In the tunnel, the payload of the secured packets represents the actual SOAM frame in this application that is exchanged with the endpoint indirectly connected to the controller through a remote device linked to it. The SOAM frames exchanged are the actual payload of the tunnel without further processing on the remote devices, so the complete processing can be done at the network controller level. Depending on the network topology, the tunnel may support no other header, but may also support VLAN and VLAN-in-VLAN headers so that the tunneled packets can be managed properly in various network topologies.

In another embodiment, one remote device may send OAM frames, such as a Link Trace message, while the other endpoint sends a Link Trace reply. In the path from one endpoint to the other, intermediate remote devices may redirect the OAM frames, following predetermined policies established in hardware assisted capable devices so that such action as adding a timestamp is possible. The frame is sent to the controller within a secured tunnel that is represented, as mentioned above, by the secured session based on the stream cipher. The network controller, upon receiving the secured packet, extracts its payload which is in fact the OAM frame that is to be processed. Then, the controller processes the OAM frame that was received from a remote virtual port linked to it by adding the proper information into the Link Trace message sent from first endpoint. Once this is done, the network controller sends the OAM frame, modified with proper information, back to the remote device using an encapsulated frame (tunnel). The remote device extracts the OAM frame from the payload contained in the secured packet by removing the encapsulation (secure) header, and then forwards the packet to the proper egress port. The OAM frame is then directed toward the next intermediate remote device doing the same processing, either locally or using an associated network controller, until the OAM frame reaches the destination device. The two endpoints are not aware that the frames are going through remote controllers. From the endpoints' perspective, the OAM frames are being received and processed by remote devices without knowing what other processing is happening on the frames sent and received through other devices or network entities other than the ones found in the direct path between the endpoints.

As part of the NFV framework, remote devices must have the capability to classify frames, such as OAM frames, and be able to take actions on each if required. The actions may include any of the following: loopback and timestamp, forward (from one port to the other), drop, timestamp and send to local CPU, or timestamp and send to remote network controller for VNF processing. The remote devices classify frames following various predetermined criteria such as the Layer 2 or Ethernet header, Layer 3 or IP header and/or Layer 4 or TCP/UDP header content. The NFV framework can provide the capability to load, execute and move VNFs across different network elements/remote devices, thus increasing the entire VNF scalability and performance. The NFV framework can provide the capability in terms of infrastructure capacity, performance and stability to optimize the location, reservation and allocation of the required resources of the VNFs. The NFV can report the exact network functions location and allocation to network entities/units so that error reporting can be associated accordingly, but also adapt, when required, the activation of VNFs depending on the underlying infrastructure to ensure that the SLA expected for one feature/function will be respected.

The NFV framework established between remote devices and one or more network controllers needs to allow partial or fully virtualized network functions (VNFs). Partial VNFs can be, for example, having SOAM Link Trace messages being processed solely by the network controller without any processing of the SOAM frame by the remote device, while having the SOAM delay measurement (DM) frames processed solely by the remote devices without having any processing by any network controller. If deemed necessary in time, the processing of the SOAM DM frames can be fully virtualized to the same network controller but in a second phase of deployment. In all cases, the NFV framework expects the devices and network controller to be able to adapt to partial or fully virtualized functions that may vary in time, to take fully advantage of VNFs supported in one or more virtual machines running different applications, modules and processes.

So, whether the services are tied to SOAM protocols, TWAMP protocols, or any other protocol, they can execute in parallel as they are distinct frames and protocols that require different classifications, actions and processing, as described above. Whether they are virtualized through a remote virtual network function running on a remote server/controller or on a remote device itself, they are supported in parallel by taking advantage of the network elements capabilities and processing power offered by the devices or the network controller instances supported by virtual machines.

The network controller may be linked and shared between potentially thousands of remote devices. The software oriented features and modules evolve separately from the hardware features and devices, and vice versa. The hardware devices are as generic as possible in terms of features/functions. Time sensitive functions are particularly targeted to be supported in the existing hardware devices with the assistance of the FPGA component. Control and data plane packets time stamping is one good illustration of function that is to be managed by hardware devices only, considering the need to have high precision and consideration for line rate processing.

Although the algorithms described above, including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for executing a Service, Operation, Administration and Maintenance (SOAM) on a network, said system comprising:
    a plurality of network controllers sending a SOAM frame in a first tunnel packet to a first device via a first tunnel;
    said first device processing said SOAM frame and forwarding the SOAM frame to a second device over said network;
    said second device processing said SOAM frame and forwarding the SOAM frame to said plurality of network controllers in a second tunnel packet via a second tunnel;
    said plurality of network controllers, upon reception of said SOAM frame, computing and storing statistics; and
    wherein said plurality of network controllers control different SOAM functions.

2. The system of claim 1, wherein:
    said first device removes a tunnel header from said first tunnel packet to extract said SOAM frame.

3. The system of claim 1, wherein said first device adds a timestamp to said SOAM frame.

4. The system of claim 1, wherein said second device adds a timestamp to said SOAM frame.

5. The system of claim 1, wherein said second device adds a tunnel header to said SOAM frame to create said second tunnel packet.

6. A method for executing a Service, Operation, Administration and Maintenance (SOAM) on a network, said method comprising:
    sending, by a plurality of network controllers, a SOAM frame in a first tunnel packet to a first device via a first tunnel;
    processing, by said first device, said SOAM frame and forwarding the SOAM frame to a second device over said network;
    processing, by said second device, said SOAM frame and forwarding the SOAM frame to said plurality of network controllers in a second tunnel packet via a second tunnel;
    computing and storing statistics, on said plurality of network controllers, upon reception of said SOAM frame; and
    wherein said plurality of network controllers control different SOAM functions.

7. The method of claim 6, further comprising:
    removing, by said first device, a tunnel header from said first tunnel packet to extract said SOAM frame.

8. The method of claim 6, further comprising:
    adding, by said first device, a timestamp to said SOAM frame.

9. The method of claim 6, further comprising:
    adding, by said second device, a timestamp to said SOAM frame.

10. The method of claim 6, further comprising:
    adding, by said second device, a tunnel header to said SOAM frame to create said second tunnel packet.

* * * * *